United States Patent
Korcz et al.

(10) Patent No.: US 8,680,394 B2
(45) Date of Patent: Mar. 25, 2014

(54) UNIVERSAL COVER PLATE ASSEMBLY

(75) Inventors: Krzysztof W. Korcz, Granger, IN (US); Mahran H. Ayrton, South Bend, IN (US)

(73) Assignee: Hubbell Incorporated, Shelton, CT (US)

( * ) Notice: Subject to any disclaimer, the term of this patent is extended or adjusted under 35 U.S.C. 154(b) by 236 days.

(21) Appl. No.: 12/851,129

(22) Filed: Aug. 5, 2010

(65) Prior Publication Data
US 2012/0031640 A1    Feb. 9, 2012

(51) Int. Cl.
*H01H 9/02* (2006.01)

(52) U.S. Cl.
USPC .................................. 174/58; 174/63; 174/67

(58) Field of Classification Search
USPC ............ 174/58, 480, 481, 50, 53, 57, 66, 67; 220/3.2–3.9, 4.02, 241, 242; 439/535; 248/906
See application file for complete search history.

(56) References Cited

U.S. PATENT DOCUMENTS

| | | | |
|---|---|---|---|
| 1,790,031 A | 1/1931 | Vaughn | |
| 3,472,945 A * | 10/1969 | Trachtenberg | 174/53 |
| 4,757,908 A | 7/1988 | Medlin, Sr. | |
| 4,964,525 A | 10/1990 | Coffey et al. | |
| 5,005,792 A * | 4/1991 | Rinderer | 248/205.1 |
| 5,189,259 A * | 2/1993 | Carson et al. | 174/66 |
| 5,574,255 A * | 11/1996 | Simmons | 174/53 |
| 5,594,207 A | 1/1997 | Fabian et al. | |
| 5,598,998 A | 2/1997 | Lynn | |
| 5,927,667 A * | 7/1999 | Swanson | 248/300 |
| 5,967,354 A * | 10/1999 | Whitehead et al. | 220/3.3 |
| 6,227,499 B1 | 5/2001 | Jennison et al. | |
| 6,323,424 B1 * | 11/2001 | He | 174/58 |
| 6,384,336 B1 | 5/2002 | VanderVelde et al. | |
| 6,508,445 B1 | 1/2003 | Rohmer | |
| 6,653,561 B2 * | 11/2003 | Lalancette et al. | 174/50 |
| 6,753,471 B2 * | 6/2004 | Johnson et al. | 174/50 |
| 6,949,708 B1 * | 9/2005 | Hausen et al. | 174/66 |
| 7,053,300 B2 | 5/2006 | Denier et al. | |
| 7,109,414 B2 | 9/2006 | Reynolds | |
| 7,301,099 B1 * | 11/2007 | Korcz | 174/58 |
| 7,427,050 B2 | 9/2008 | Stahl, Sr. et al. | |
| 7,677,512 B1 | 3/2010 | Ford et al. | |
| 2003/0226683 A1 | 12/2003 | Tufano et al. | |
| 2005/0067546 A1 | 3/2005 | Dinh | |
| 2009/0272572 A1 | 11/2009 | Collins et al. | |
| 2010/0025066 A1 | 2/2010 | de la Borbolla | |
| 2010/0051312 A1 | 3/2010 | Daniels et al. | |

* cited by examiner

*Primary Examiner* — Boris Chervinsky
*Assistant Examiner* — Pete Lee
(74) *Attorney, Agent, or Firm* — Garrett V. Davis; Mark S. Bicks; Alfred N. Goodman

(57) ABSTRACT

A cover plate assembly and an electrical box are provided for mounting one or more electrical wiring devices. The cover plate assembly can be modified to provide a single gang, double gang or triple gang assembly for mounting the wiring devices. The cover plate assembly includes a collar forming a mud ring having at least one removable portion which can be removed to form an open side of the collar. An adapter is attached to the cover plate assembly at the open side of the collar to enlarge the dimensions of the collar to receiving a plurality of electrical wiring devices.

33 Claims, 7 Drawing Sheets

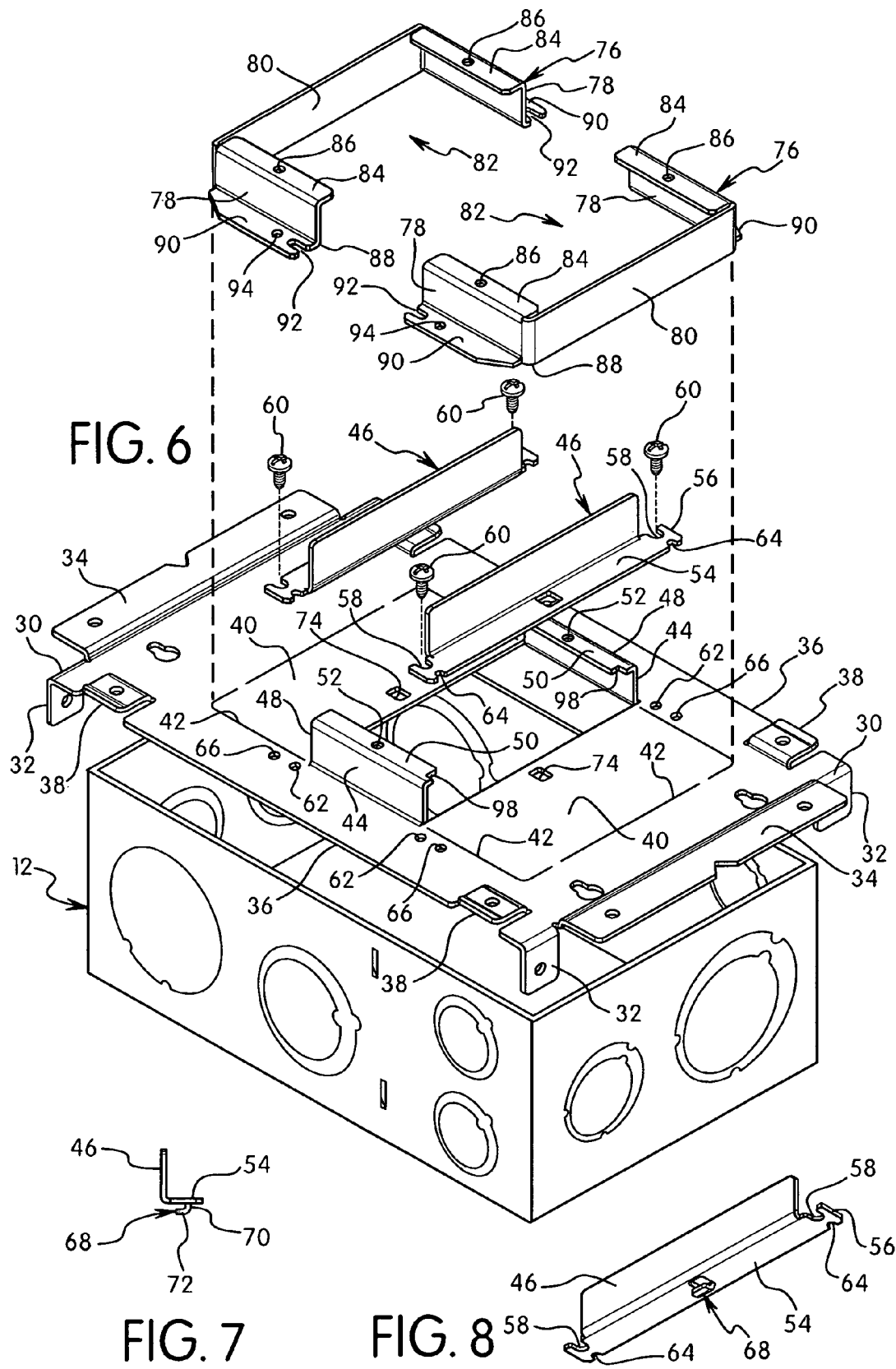

UNIVERSAL COVER PLATE ASSEMBLY

FIELD OF THE INVENTION

The present invention is directed to a universal a cover plate assembly for coupling to an electrical box and particularly to a data box. The cover plate assembly can be modified to support one or more electrical wiring devices. The invention is particularly directed to a cover plate assembly having a collar defining a mud ring where the dimension of the mud ring can be modified to accommodate a plurality of electrical wiring devices.

BACKGROUND OF THE INVENTION

Communication outlets are commonly used in building construction for housing communication and entertainment equipment such as telephone, computer and internet connections and television cable connections. Communication connections typically include a box supporting a wall plate having a communication outlet where the box is mounted to a building stud. The box is often located next to an electrical outlet box containing a power receptacle. Current building codes do not allow power and communication cables in the same box without a physical barrier between them. This generally results in two separate boxes being required, which increase the expense and labor for the installation.

Electrical boxes used for communication cables are often used in connection with an electrical box where the boxes are ganged together. The ganged boxes enable mounting of two or more electrical devices. The ganged boxes are generally connected together by screws or other fasteners to comply with the building codes. The ganged boxes result in an increased expense and labor to conform to the building codes.

Various devices have been proposed for forming a barrier between high voltage wiring devices and low voltage communication cables. One example is disclosed in U.S. Pat. No. 5,594,207 to Fabian et al. This device includes a box having a self-locking divider made of a flat sheet metal that can be inserted to form separate compartments. The electrical box has upper and lower ledges which form aligned slots to receive the divider plate.

Another device is disclosed in U.S. Pat. No. 7,677,512 to Ford et al. which discloses a mounting bracket for electrical outlets and low voltage units. The bracket has a border with a central opening to fit one or more receptacles and one or more low voltage units. The bracket has a snap-off alignment bar to align the receptacle. Protruding wiring flanges provide support for the low voltage wires and cabling.

A gangable low voltage bracket for electrical devices is disclosed in U.S. Pat. No. 6,508,445 to Rohmer. The bracket is a low voltage old work bracket that can be ganged into a two gang or three gang assembly without modification of the bracket. The sides of the bracket are staggered to enable the first side wall from the second bracket to fit over the second side wall of the first bracket. Corresponding tongues and grooves hold the ganged brackets together. The brackets can include a wire retention tab and a pair of swing arms on opposing corners of the bracket frame.

U.S. Pat. No. 1,790,031 to Vaughn discloses a support attached to a stud for supporting a plurality of electrical boxes. The support includes parallel support arms extending between the studs and having a plurality of perforations. The electrical box is mounted to the support arms. Plates are mounted on the support arms and fixed to the support arms by a wire fastener that extends through the plates and the perforations in the arm.

U.S. Patent Publication No. 2005/0067546 to Dinh discloses an elongated mounting bracket that can be attached to a cross member extending between adjacent wall studs. The adapter plate has an integrally formed mud ring and is attached to the bracket for supporting an electrical box. The adapter plate has a fixed opening which limits the number of wiring devices that can be mounted.

U.S. Patent Publication No. 2010/0051312 to Daniels et al. discloses a modular wall cover system. The wall cover includes a cover plate assembly formed from a plurality of different cover plates that are coupled together and attached within a frame. The plates are assembled together for supporting different electrical devices.

U.S. Pat. No. 5,598,998 to Lynn discloses a bracket for use in conjunction with an electrical outlet box for attaching a low voltage device. The bracket has a C shape that is attached to the building stud and surrounds the electrical box. The opening in the C-shaped frame has a dimension to receive the electrical box and the low voltage device adjacent the electrical box.

The above described devices have generally been acceptable for their intended use. However, there is a continuing need in the industry for an improved mounting system for wiring devices.

SUMMARY OF THE INVENTION

The present invention is directed to a universal cover plate assembly and electrical box for accommodating a plurality of electrical wiring devices. The invention is particularly directed to a universal cover plate assembly that is capable of supporting wiring devices for connecting to power cables and low voltage wiring. The cover plate assembly is suitable for mounting on an electrical box or data box. The cover plate assembly can support a single wiring device and can be easily modified to accommodate a plurality of wiring devices.

One aspect of the invention is to provide a cover plate assembly for an electrical box or data box that is easily manufactured and simple to use during the installation.

Another aspect of the invention is to provide a cover plate assembly that can be attached to the electrical box and where the cover includes an upwardly extending collar defining a mud ring. The collar is constructed such that the dimension of the collar can be enlarged to accommodate a plurality of wiring devices.

A further aspect of the invention is to provide a cover plate assembly that can support low voltage wiring devices and high voltage wiring devices and where the cover plate can have a divider plate positioned between the compartments for the different wiring devices.

The invention is also directed to a cover plate assembly having a collar defining a mud ring where at least one portion of the collar is removable. An insert or adapter can then be coupled to the cover plate assembly to enlarge the dimension of the collar and the dimension of the opening in the cover plate assembly.

The cover plate assembly in one embodiment of the invention has a central opening for receiving a wiring device. The cover plate can be provided with one or more removable portions that can be removed to enlarge the dimension of the opening in the cover plate. The enlarged opening in the cover plate enables the cover plate assembly to accommodate two or more electrical wiring devices.

The cover plate assembly of the invention in one embodiment includes a removable divider plate forming a partition wall that can be inserted into the electrical box and coupled to the cover plate assembly to separate a high voltage compartment from a low voltage compartment.

The cover plate assembly in one embodiment of the invention includes a collar defining a mud ring surrounding a central opening where the collar has one or more removable side walls. In one embodiment, the collar has two removable side walls on opposite sides of the collar. An adapter can be coupled to the assembly adjacent the open sides of the collar to enlarge the dimension of the collar. In one embodiment, the adapter has two opposite end walls and a side wall forming an open side that is joined to the open side of the collar.

The various aspects and advantages of the invention are basically attained by providing a cover plate for an electrical box comprising a base having an opening with a dimension to receive an electrical wiring device. The base has a dimension for mounting to an open end of an electrical box. The base has at least one removable portion adjacent the opening. A collar surrounds the opening and extends from the base. The collar has at least one removable side and is adapted for receiving a replacement adapter side member for enlarging the dimension of the collar to receive a plurality of electrical wiring devices.

The aspects of the invention are further attained by providing a cover plate for an electrical box comprising a base having an opening with a dimension to receive an electrical wiring device. The base has a dimension for mounting to an open end of an electrical box. A collar surrounds the opening in the base and extends outwardly from the plane of the base. The collar has at least one removable side wall defining an open side for receiving an adapter to enlarge an inner dimension of the collar.

The various aspects of the invention are further attained by providing a cover plate assembly comprising a base having a dimension for coupling to an open end of an electrical box. The base has an opening with a dimension for receiving an electrical wiring device. A collar extends from the base and surrounds the opening. The collar has a first inner dimension and a first end wall, a second end wall, and a first side wall and a second side wall. The first side wall is removably coupled to the assembly. A first adapter is coupled to the assembly to replace the first side wall. The first adapter is adapted for coupling to the assembly and cooperating with the collar for defining a second inner dimension that is greater than the first inner dimension.

These and other aspects, advantages and salient features of the invention will become apparent from the following details description of the invention in conjunction with the annexed drawings which disclose various embodiments of the invention.

BRIEF DESCRIPTION OF THE DRAWINGS

The following is a brief description of the drawings, in which:

FIG. 6 is an exploded view of the cover plate assembly of FIG. 1;

FIG. 7 is an end view of the side wall of the cover plate assembly;

FIG. 8 is a bottom perspective view of the side wall of the cover plate assembly;

DETAILED DESCRIPTION OF THE INVENTION

Figure 1:
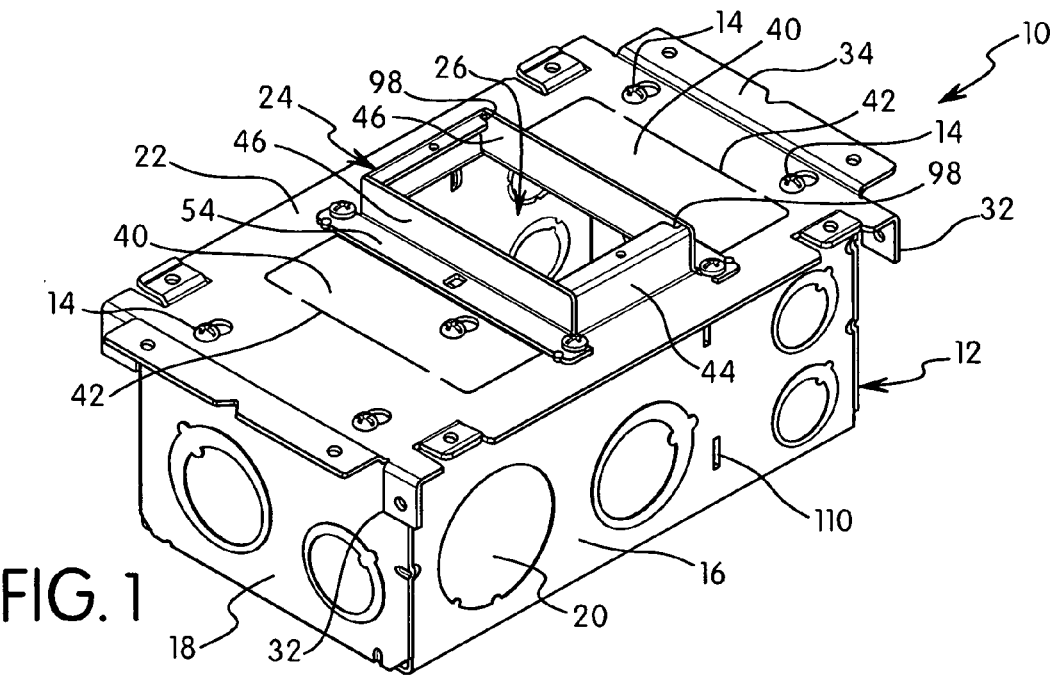
FIG. 1 is a perspective view of the cover plate assembly and electrical box in one embodiment of the invention.

The present invention is directed to a universal cover assembly for a data box and/or electrical box. The invention is particularly directed to a universal cover assembly that can be modified from a single gang unit to a multi-gang unit to accommodate a plurality of wiring devices. The cover plate assembly of the invention is also capable of supporting a high voltage wiring device and low voltage wiring devices such as communication cables by providing a partition to form separate compartments while supporting two or more wiring devices.

Referring to the drawings, the cover plate assembly 10 is coupled to an electrical box 12 by screws 14. Electrical box 12 as shown in the drawings includes side walls 16 and end walls 18 each with a plurality of knockouts 20. Electrical box 12 is connected to suitable cables or wiring (not shown). Electrical box 12 is adapted for connecting to high voltage power cables and low voltage communication cables. Electrical box 12 includes inwardly extending tabs 21 with a threaded hole for receiving the screws 14 for attaching cover plate assembly to electrical box 12. Electrical box 12 can have different configurations and dimensions and can be a data box as known in the art for receiving communication cables. For convenience herein, the box is referred to as an electrical box.

Cover plate assembly 10 includes a base 22 and a collar 24. Base 22 in the embodiment illustrated has a substantially rectangular configuration with a dimension to overlie the open top end of electrical box 12. Typically base 22 has a flat planar configuration and is made from steel that is cut, stamped and formed into the configuration shown in FIGS. 1-6.

Base 22 has a flat planar configuration with an opening 26 for receiving an electrical wiring device. Opening 26 in the embodiment illustrated is located in the central portion of base 22 to define a central opening. Base 22 includes a plurality of keyhole shaped slots 28 for receiving mounting screws 14 for attaching base 22 to electrical box 12. Base 22 has opposite edges 30 with a downwardly turned tab 32 at each corner for positioning cover plate assembly 10 onto the electrical box 12. Each edge 30 in the embodiment shown has a mounting tab 34 for attaching to a wall stud or other support for supporting cover plate assembly 10 and electrical box 12.

Figure 2:
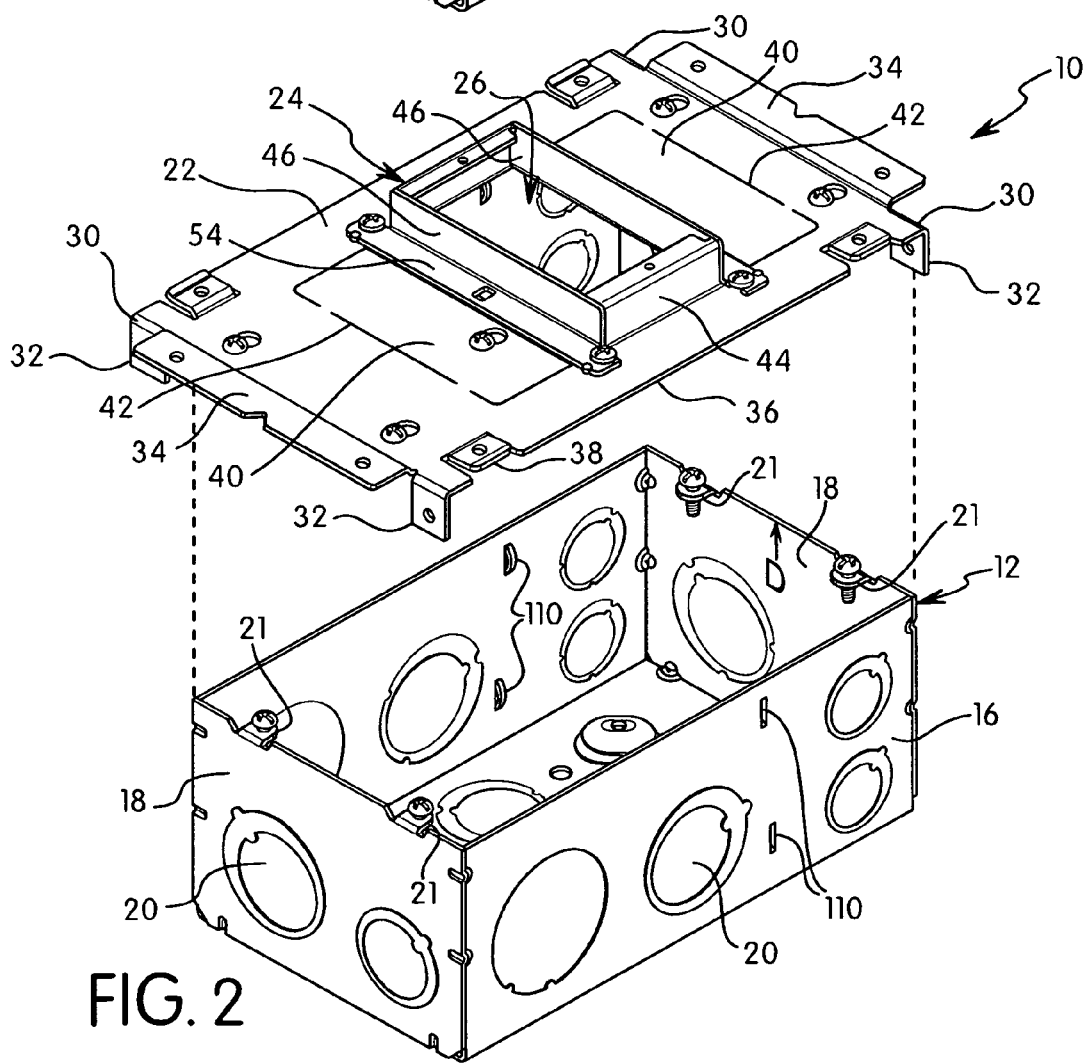
FIG. 2 is an exploded view of the assembly of FIG. 1.
Figure 5:
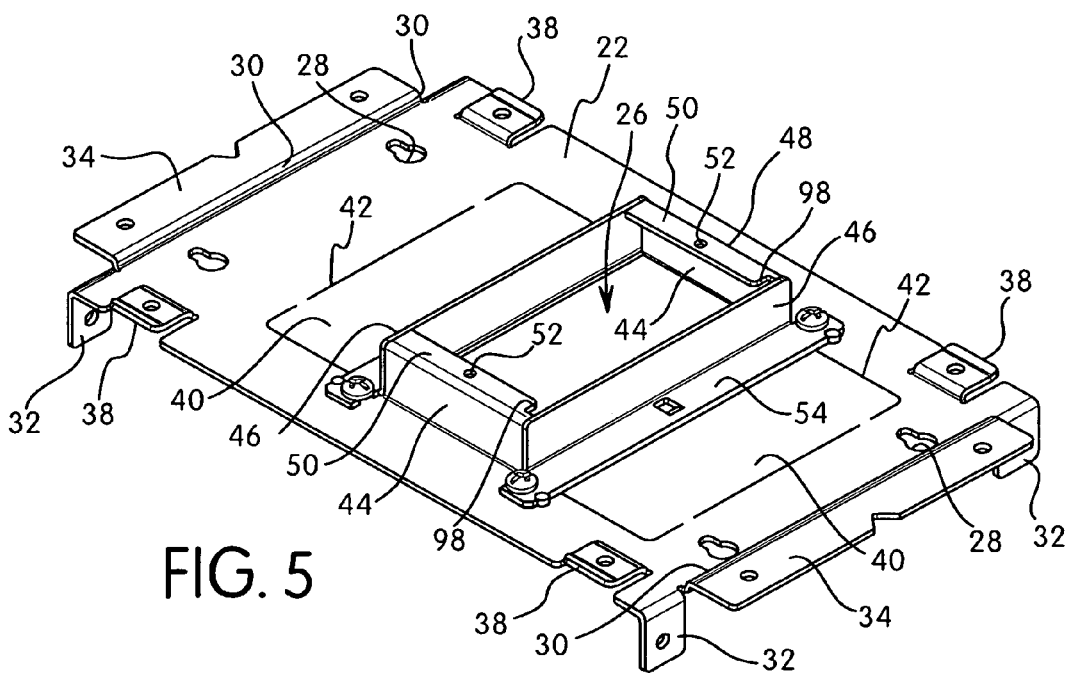
FIG. 5 is a top perspective view of the cover plate assembly.
Figure 16:
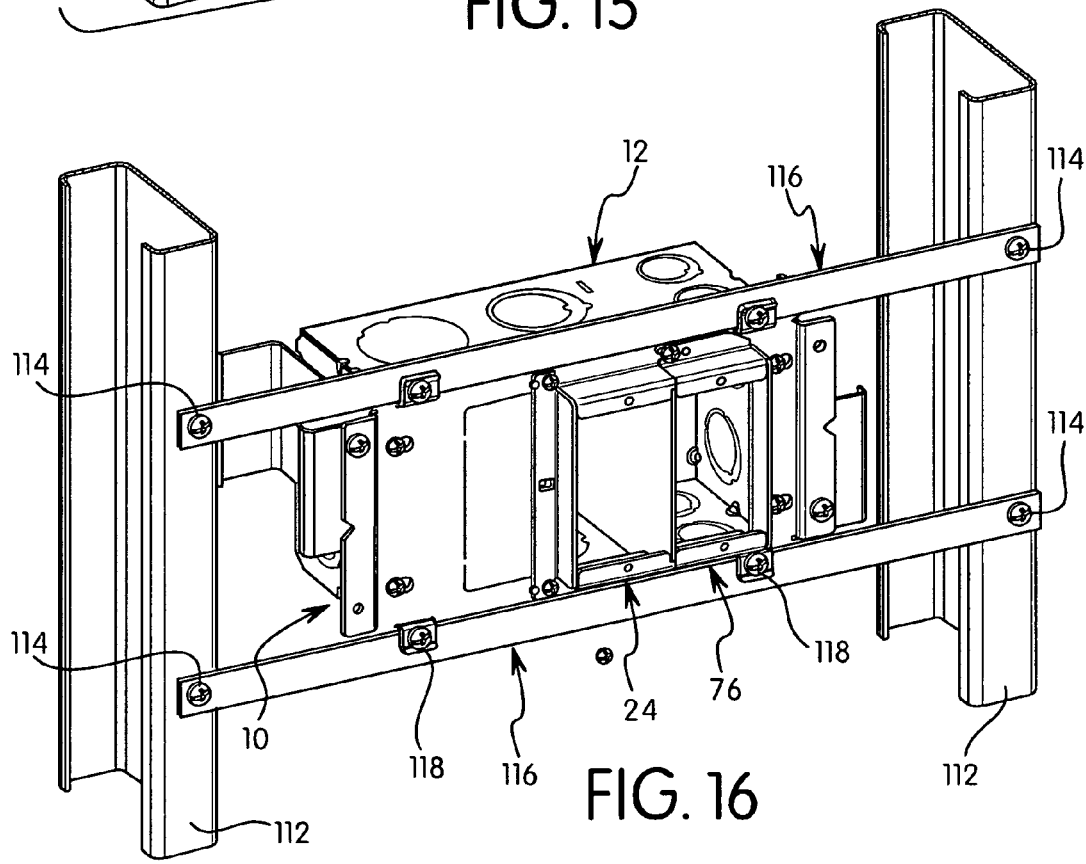
FIG. 16 is a perspective view of the cover plate assembly and electrical box attached to a mounting strip.

The longitudinal side edges 36 of base 22 include tabs 38 that are bent out of plane of base 22 for coupling with a mounting strip that can extend between adjacent wall studs. As shown in FIGS. 2 and 5 tabs 38 are parallel to base 22 and spaced from the plane of base 22 a distance to receive and couple to a mounting strip as shown in FIG. 16.

Referring to FIG. 5, base 22 includes at least one and preferably two removable portions 40. Removable portions 40 are defined by frangible break lines 42 adjacent the central opening 26. Preferably, the removable portions 40 are contiguous with the central opening 26 such that the removable portions are defined by the frangible break line 42 extending around three sides of the removable portion 40. Preferably, each removable portion 40 has a substantially rectangular shape and a dimension to receive an electrical wiring device. In the embodiment shown in FIGS. 1-5, cover assembly 10 is constructed as a single gang unit for supporting a single wiring device.

Referring to FIGS. 1-4, collar 24 surrounds the central opening 26 of base 22 and extends in an upward direction from the plane of base 22. Collar 24 has a dimension to define a mud ring for use in wall construction. Collar 24 in the original configuration shown in FIGS. 1 and 4 has an internal dimension for supporting a single wiring device. The wiring device can be a switch, electrical receptacle or low voltage connector for cable or telephone lines.

In the embodiment illustrated, collar 24 has a substantially rectangular configuration formed by end walls 44 and side walls 46 extending between the end walls 44. The end walls 44 in the embodiment illustrated are integrally formed with the base 22 and extend perpendicular from the plane of the base 22. End walls 42 are stamped or cut from a blank sheet of metal and bent to the position shown in FIG. 5 to form the central opening 26. End walls 42 have a top edge 48 with a mounting flange 50 extending inwardly with respect to central opening 26. Each flange 50 has a dimension to support the electrical wiring device. A threaded hole 52 in each flange 50 is provided for receiving a mounting screw for attaching the wiring device to the collar 24.

Side walls 46 of collar 24 in a preferred embodiment of the invention are removably coupled to cover plate assembly 10 and are formed as separate elements. Side walls 46 have a longitudinal dimension to extend between the end walls 42 and have a height corresponding to the height of end walls 42. In the embodiment illustrated, each side wall 46 has a base flange 54 extending perpendicular from side wall 46. Base flange 54 has a length greater than the longitudinal length of side wall 46 to define an end portion 56 extending beyond the longitudinal edge of side wall 46. Each end portion 56 has a first U-shaped recess 58 for receiving a mounting screw 60. Screw 60 is received in a threaded hole 62 in base 22. A second U-shaped recess 64 is provided on an opposite side of base flange 54 from the first U-shaped recess 58. U-shaped recess 64 is aligned with a dimple 66 or detent extending upwardly from the base 22 for positioning side wall 46 with respect to end walls 44 and aligning the U-shaped recess 58 with the threaded hole 62.

Figure 4:
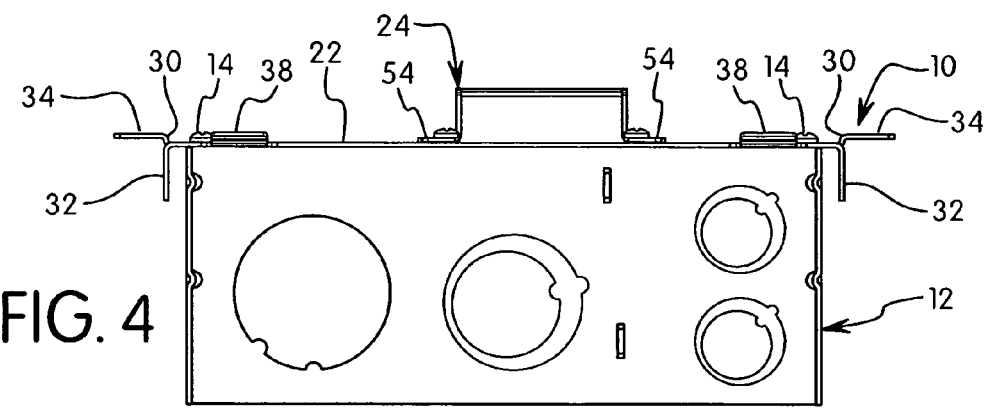
FIG. 4 is a side view of the cover plate assembly of FIG. 1.

As shown in FIGS. 6 and 7, base flange 54 includes a centrally located tab 68 forming a hook-like member. As shown in FIG. 6, the tab 68 has a downward extending portion 70 and a second portion 72 extending parallel to base flange 54 and spaced from base flange 54 a distance corresponding substantially to the thickness of base 22. Tab 68 extends in a direction toward side wall 46 and is hooked into an aperture 74 in base 22 for stabilizing the side wall and resisting deflection of the removable portion 40. As shown in FIG. 4, the side walls 46 are attached to the base 22 to form the collar 24 surrounding the opening 26 in the base 22.

Figure 12:
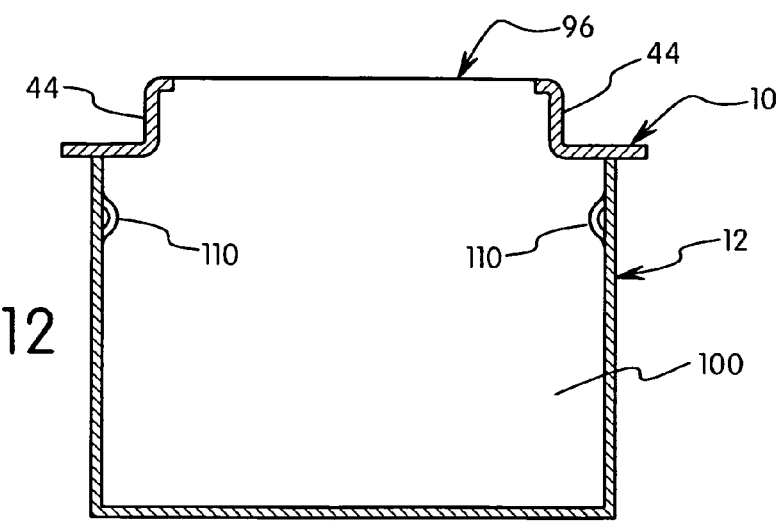
FIG. 12 is a cross-sectional end view of the electrical box and cover plate assembly showing the divider plate in the electrical box.

Collar 24 as shown in FIGS. 1-5 has a dimension for receiving and supporting a single wiring device. The cover plate assembly 10 of the invention is adapted for accommodating a plurality of wiring devices by modifying the dimension of the central opening and the dimensions of the collar. The dimensions of collar 24 can be enlarged to accommodate two or more wiring devices by removing a side wall 46 from base 22. The screws 60 holding the respective side wall in place can be loosened without removing the screws from base 22 to enable separation of the side wall 46 from the base. A removable portion 40 of base 22 is removed by breaking along the frangible lines 42 to expand the dimension of the central opening 26. An adapter insert 76 is then coupled to base 22 as shown in FIGS. 8 and 12 to enlarge the dimension of the collar 24 to modify the assembly from a single gang unit shown in FIGS. 1-5 to a two gang unit shown in FIG. 9 or a three gang unit shown in FIGS. 14 and 15.

Figure 10:
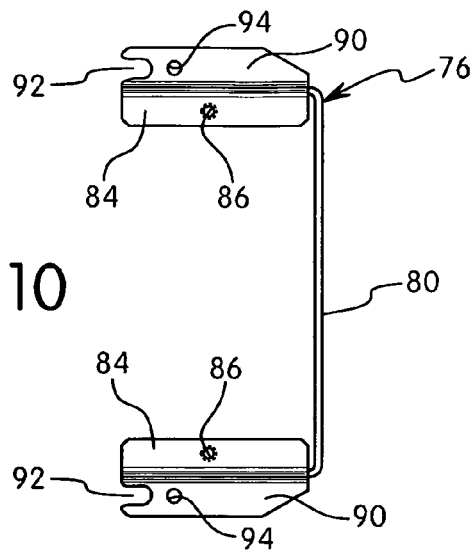
FIG. 10 is a top view of the adapter member of FIG. 8.

Adapter 76 has a shape and dimension to surround the open area defined by removing the removable portion 40 from base 22. Adapter 76 as shown in FIGS. 6 and 10 include ends walls 78 and a side wall 80 extending between end walls 78. The end walls 78 and side wall 80 form an open side 82 that joins with the open side formed by removing one of the side walls 46. Side walls 80 and end walls 78 have a height corresponding substantially to the height of end walls 44 of collar 24 to form a substantially continuous wall surrounding the opening in the base 22. End walls 78 have an inwardly extending flange 84 with a threaded aperture 86 for mounting a wiring device. End walls 78 have a bottom end 88 with an outwardly extending base flange 90 for attaching to the top surface of base 22. As shown in FIGS. 6 and 10, base flange 90 includes a U-shaped recess 92 for receiving a screw 60 and an aperture 94 for receiving the dimple 66 to align adapter 76 with the opening in base 22.

Figure 9:
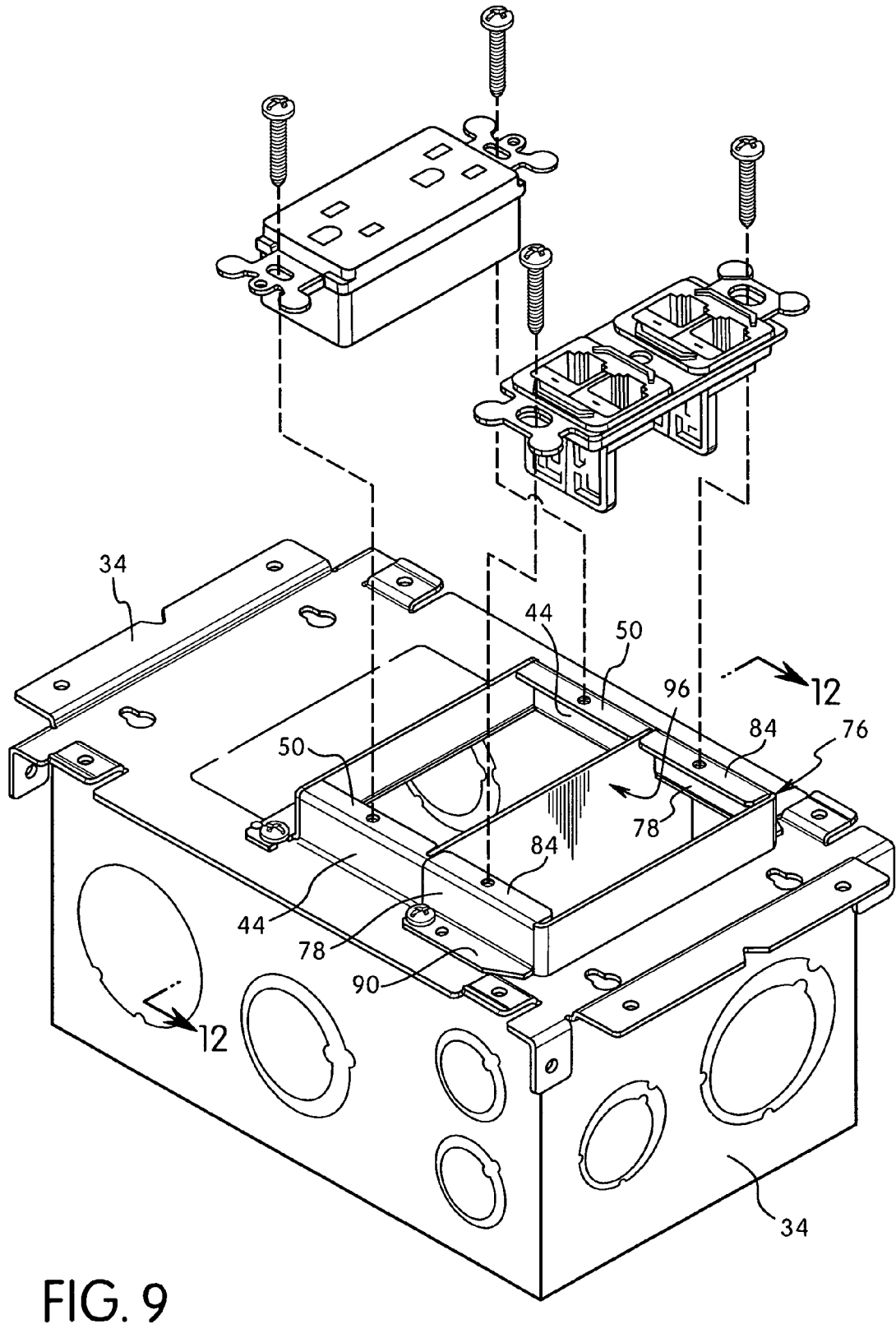
FIG. 9 is a perspective view of the cover plate assembly showing the adapter member connected to the plate.

In the embodiment shown in FIG. 9, the collar formed by the end walls 44 and the adapter 76 is adapted for supporting a low voltage communication device and an electrical receptacle or other high voltage wiring device. A divider plate 96 is provided for forming a partition wall between compartments supporting the different wiring devices. One end of each of the end walls 44 is formed with a notch 98 having a dimension to receive the divider plate 96 as shown in FIG. 9.

Figure 3:
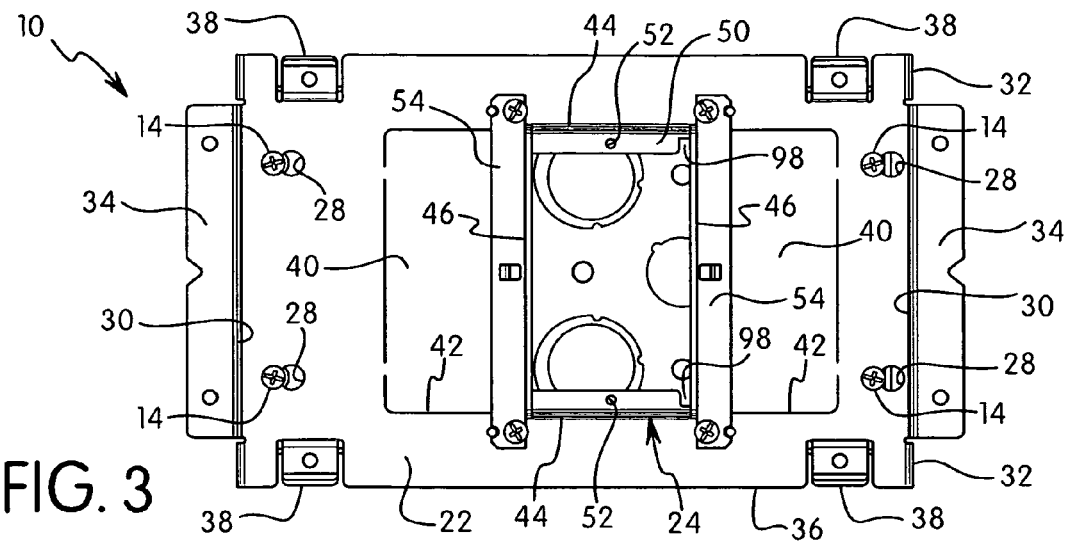
FIG. 3 is a top view of the cover plate assembly of FIG. 1.
Figure 11:
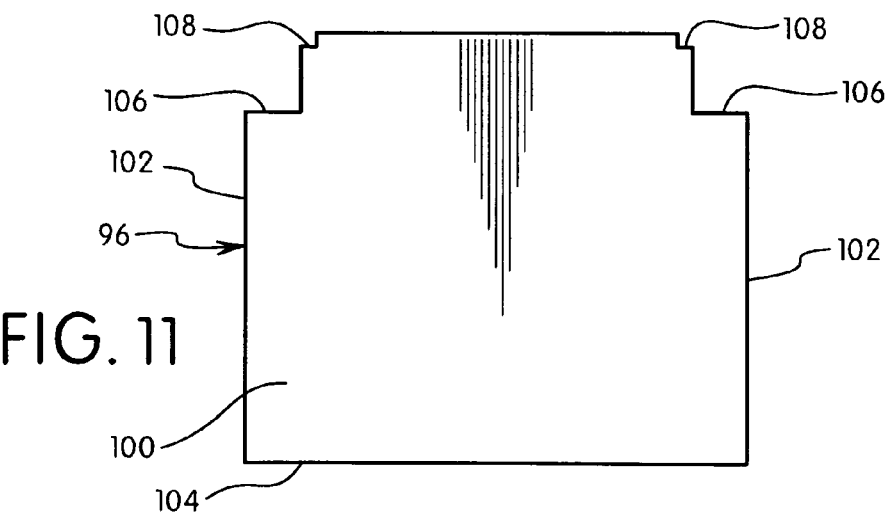
FIG. 11 is a side view of the divider plate.

Divider plate 96 as shown in FIG. 11 has a dimension corresponding to the inner dimension of electrical box 12 and the recessed area defined by collar 24. As shown in FIG. 10, divider plate 96 has a body 100 with side edges 102 and a bottom edge 104. Body 100 has a first notched portion 106 corresponding to the dimension of the space between the end walls 44 and the inner surface of the side walls of the electrical box. A second notched portion 108 can be provided for being received in the notch 98 in the flange 50. The inner surface of side walls 16 of electrical box 12 as shown in FIG. 3 have a pair of spaced apart U-shaped detents 110 for supporting divider plate 96. The detents 110 are punched from the side wall 16 to form a substantially U-shape extending inwardly into the cavity of the electrical box 12. As shown in FIG. 3, the detents are spaced apart with respect to the longitudinal dimension of the side wall to engage opposite sides of the divider plate 96 thereby supporting the divider plate in a fixed upright position within the electrical box 12. The top edge of divider plate 96 is received in the notches 98.

Figure 13:
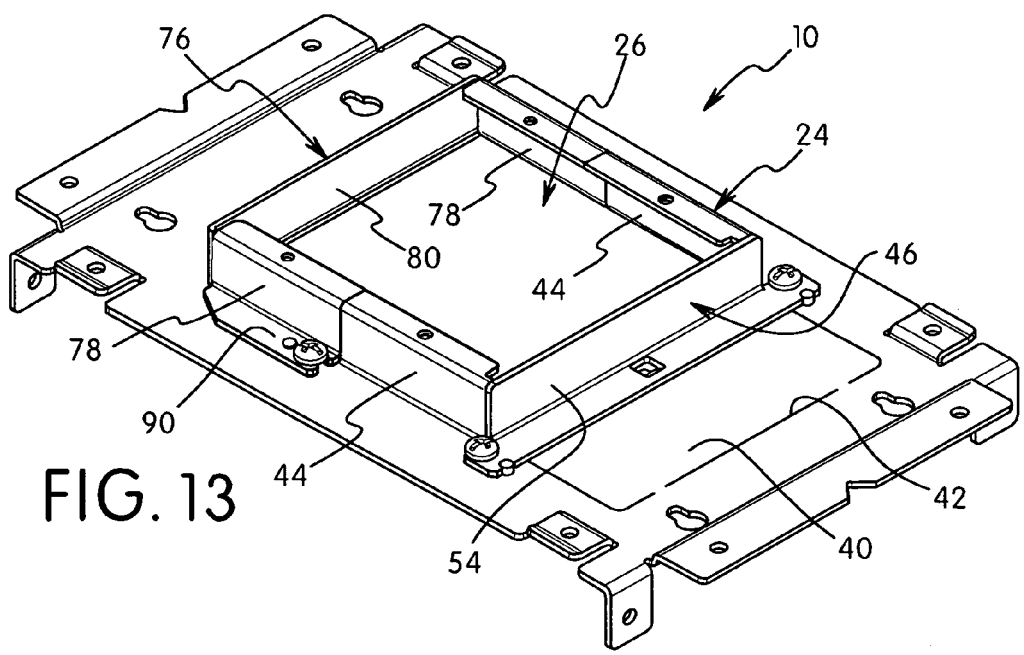
FIG. 13 is a perspective view of the cover plate assembly in another embodiment of the invention.
Figure 14:
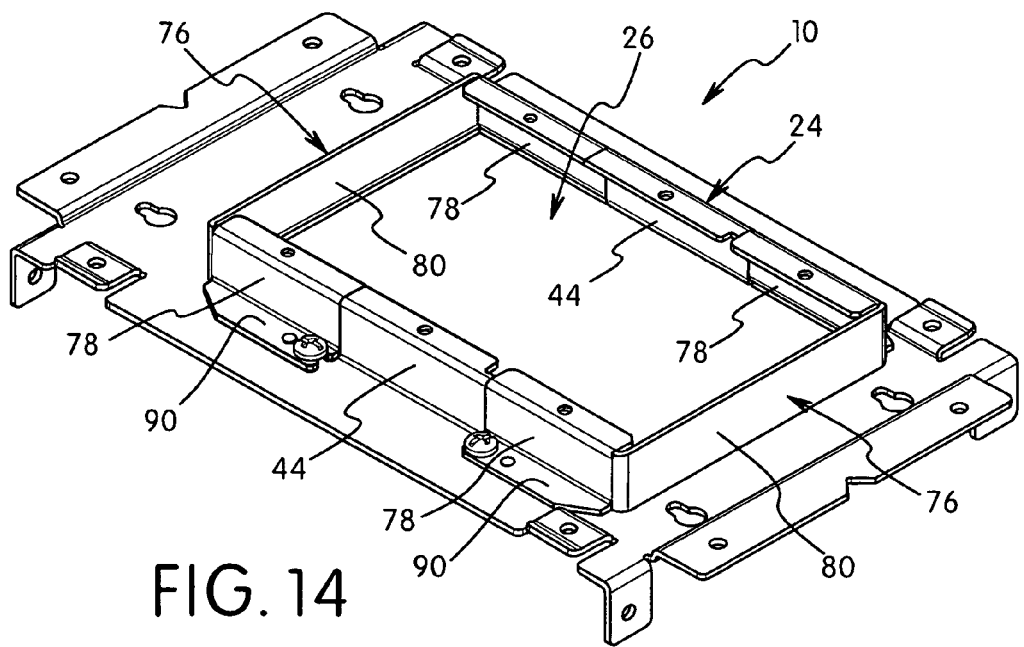
FIG. 14 is a perspective view of the cover plate assembly in a further embodiment of the invention.

Cover plate assembly 10 of the invention is capable of supporting a single wiring device as shown in FIG. 1, two wiring devices as shown in FIGS. 9 and 13, and three separate wiring devices as shown in FIG. 14. Either of the removable side walls 46 of collar 24 can be removed and either of the removable portions 40 of base 22 can be removed depending on the wiring devices being mounted. The adapter 76 can be attached to either of the opening ends of the collar formed by removing the respective side wall 46 to form a two gang unit as shown in FIG. 9. In a further embodiment shown in FIG. 13, both of the side walls 46 can be removed and an adapter 76 can be attached to the base 22 to form a three gang mounting assembly for three separate wiring devices.

The cover plate assembly of the invention can be packaged as an assembly including the base 22 and collar 24 as shown in FIG. 1, and two adapters 76 to allow modification of the assembly at the installation site. Depending on the needs at the installation site, one or both of the side walls 76 and removable portions 40 can be removed from the base 22 and one or two adapters 76 coupled to the base. In this manner cover plate assembly 10 can be modified from a single gang unit shown in FIG. 1 to a two gang unit shown in FIG. 9 or a three gang unit shown in FIGS. 14 and 16. A divider plate 96 can be attached to the electrical box and the end walls 44 as needed to separate a high voltage wiring device from a low voltage wiring device.

Figure 15:
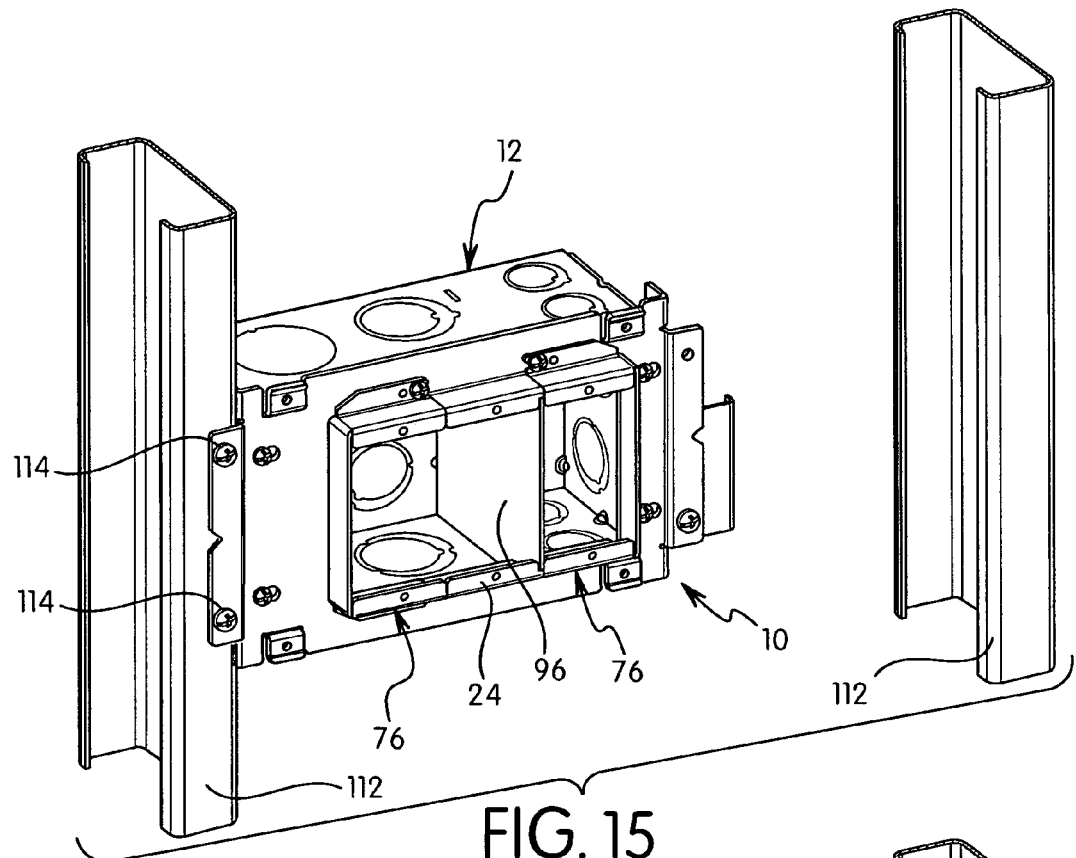
FIG. 15 is a perspective view of the cover plate assembly and the electrical box mounted to a wall stud.

Cover plate assembly 10 is adapted for mounting in various locations without interfering with the function of the cover plate assembly and/or the electrical box 12. As shown in FIG. 14, cover plate assembly 10 can be attached to a wall stud 112 by the mounting tab 34. A screw or fastener 114 extends through screw holes in the mounting tab 34 for mounting the cover plate assembly 10 to the stud 112. In a further embodiment, the cover plate assembly 10 can be attached to metal straps 116 extending between two wall studs 112 as shown in FIG. 15. The straps 116 are attached to the cover plate assembly by the tabs 38 and screws 118.

While various embodiments have been chosen to illustrate the invention, it will understood by those skilled in the art that various changes and modifications can be made without departing from the scope of the invention as defined in the appended claims.

What is claimed is:

1. A cover plate assembly for an electrical box, comprising:
a base having a central opening with a first dimension to receive a first electrical wiring device, said base having a dimension for mounting to an open end of an electrical box, said base having at least one removable portion adjacent said central opening to form a second central opening in said base with a second dimension in said base to receive a second electrical wiring device; and
a collar surrounding said opening in said base and extending perpendicular from said base, said collar having an open front side with a flange extending inwardly from said collar for supporting the electrical wiring device and an open rear side for communicating with the electrical box and at least one removable side, said removable side of said collar being removable from said base to form an open side of said collar and for receiving a replacement adapter side member for coupling to said open side of said collar and for enlarging the dimension of said open front side of said collar to receive a plurality of electrical wiring devices.

2. The cover plate of claim 1, wherein
said removable portion in said base is defined by a frangible line extending around three sides of said removable portion.

3. The cover plate of claim 1, wherein
said base has a planar portion with a first removable portion adjacent a first side of said opening in said base and a second removable portion adjacent a second side of said opening in said base.

4. The cover plate of claim 1, wherein
said replacement adapter side member has a first end wall, a second end wall, a side wall extending between said end walls and an open side for mating with an open side of said collar formed by removing said at least one removable side.

5. The cover plate of claim 1, wherein
said collar includes a first end wall and a second end wall, said end walls being integrally formed with said base, and a first side wall and a second side wall, said side walls being removably coupled to said assembly.

6. The cover plate of claim 1, further comprising
a removable divider plate for being received in the electrical box to define at least two chambers in the electrical box, said divider plate having a top edge for coupling to said collar and being positioned between end walls of said collar and end walls of said replacement adaptor side member.

7. The cover plate of claim 6, wherein
said collar has a first end wall and a second end wall, each of said end walls having a notch at a side edge thereof for receiving the top edge of the divider plate and supporting the divider plate between the end walls of the collar and the end walls of the replacement adapter.

8. The cover plate assembly of claim 1, wherein
said base has a planar portion with said opening being formed in said planar portion, and said removable portion being formed in said planar portion.

9. The cover plate assembly of claim 1, wherein
said removable side wall of said collar is coupled to said base by a fastener.

10. The cover plate assembly of claim 9, wherein
said replacement adapter is coupled to said base.

11. The cover plate assembly of claim 1, wherein said removable side wall of said collar comprises
a side wall portion for mating with end walls of said collar, and
a flange extending from said side wall portion and being coupled directly to said base.

12. A cover plate for an electrical box comprising:
a base having an opening with a dimension to receive a first electrical wiring device, said base having a dimension for mounting to an open end of an electrical box, said base having a planar outer surface with a removable portion adjacent said opening to enlarge the dimension of said opening for receiving a second electrical wiring device; and
a collar surrounding said opening in said base and extending outwardly perpendicular from the plane of said base, said collar having an open rear end for communicating with the electrical box and an open front end with a top edge having an inwardly extending flange for supporting the electrical wiring device, at least one removable side wall for defining an open side for receiving at least one first adapter to enlarge an inner dimension of said collar, said adapter having a first end wall, a second end wall and a side wall extending between said end walls and an open side, said end walls being adapted for mating with end walls of the collar to enlarge the dimension of the collar.

13. The cover plate of claim 12, wherein
said collar has two removable side walls, each of said removable side walls being removable to form an open side for receiving said first adapter or a second adapter.

14. The cover plate of claim 12, wherein
said collar has a first end wall and a second end wall, each of said end walls being integrally formed with said base; and
said at least one removable side wall includes a bottom flange removably coupled to said base and extending between said end walls.

15. The cover plate of claim 14, wherein
said removable portion is adjacent end walls of said collar.

16. The cover plate of claim 15, further comprising
a removable divider plate, said divider plate coupled to said base and extending between outer edges of said end walls of said collar.

17. The cover plate of claim 16, wherein
said divider plate is positioned between said outer edges of said end walls and outer edges of said adapter.

18. The cover plate of claim 17, wherein
said end walls of said base have a notch in said outer edges, and where said divider plate has a top edge receiving in said notch.

19. The cover plate of claim 12, wherein
said end walls of said adapter have an inwardly extending flange at an upper end for mounting a wiring device, and said side wall has an outwardly extending flange at a bottom edge thereof for coupling to said base.

20. The cover plate of claim 12, wherein
said base further comprising a mounting member for mounting said base to a support structure.

21. The cover plate assembly of claim 12, wherein
said base has a planar portion with said opening formed in said planar portion, said planar portion further having a removable portion coupled to said planar portion by frangible lines, said removable portion forming one side of said opening in said base, and
said removable side wall of said collar overlying said removable portion of said base and being coupled to said base.

22. The cover plate assembly of claim 21, wherein
said collar has first and second end walls integrally formed with said base, and where said removable side wall has a flange at a bottom edge thereof coupled to said base.

23. The cover plate of claim 16, further comprising
an electrical box coupled to said base, said electrical box having first and second end walls with a coupling member for cooperating with said divider plate and retaining said divider plate in an upright position.

24. A cover plate assembly, comprising:
a base having a dimension for coupling to an open end of an electrical box, said base having an opening with a dimension for receiving an electrical wiring device, said base having a removable portion adjacent said opening in said base defined by frangible lines in said base;
a collar extending from said base and surrounding said opening, said collar having a first inner dimension with a first end wall, a second end wall, a first side wall and a second side wall, said first side wall being removably coupled to said assembly to form an open side of said collar, said collar having an open rear end for communicating with the electrical box and an open front end for supporting the electrical wiring device; and
a first adapter for coupling to said assembly to replace said first side wall, said first adapter being adapted for coupling to said assembly and configured for cooperating with said open side of said collar for defining a second inner dimension that is greater than said first inner dimension, wherein said first adapter comprises:
a first end wall;
a second end wall; and
a side wall extending between said end walls, said end walls being adapted for mating with said end walls of said collar, said adapter having an open bottom end for communicating with said opening in said base, and an open top end for supporting an electrical wiring device.

25. The cover plate assembly of claim 24, wherein
said end walls of said first adapter and said end walls of said collar include a mounting member for mounting an electrical wiring device.

26. The cover plate assembly of claim 25, wherein
said second side wall of said collar is removable and said assembly further comprises a second adapter for coupling to said assembly to replace said second side wall, said second adapter having a first end wall, a second end wall and a side wall extending between said end walls.

27. The cover plate assembly of claim 24, wherein
said first end wall and said first adapter are adapted for coupling directly to said base.

28. The cover plate assembly of claim 24, further comprising:
a divider extending between said end walls of said collar and being positioned at a first end of each of said end walls of said collar.

29. The cover plate assembly of claim 28, wherein
said first end of said end walls of said collar include a notch for receiving said divider.

30. The cover plate assembly of claim 24, wherein
said base has at least one screw hole for receiving a fastening screw for coupling said first side wall to said base and for coupling said first adapter to said base.

31. A cover assembly, comprising:
a collar having a base for coupling to an open end of an electrical box and extending from said base, said collar being defined by a first end wall and a second end wall integrally formed with said base and adapted for supporting a first electrical wiring device, a removable first side wall coupled to said assembly and extending between first ends of said first end wall and second end wall, said removable first side wall being removable to form a first open side of said collar, and said base has an opening and a removable portion contiguous with said opening, said
removable portion being separable from said base to enlarge the dimension of said opening,
a first adapter member configured for coupling to said open side of said collar, said first adapter member having first and second end walls and a side wall extending between said end walls of said first adapter, each said end walls of said first adapter member having a flange at a top end thereof for supporting a second electrical wiring device.

32. The cover assembly of claim 31, further comprising an electrical box having an open end, and where said base is coupled to said open end.

33. The cover plate assembly of claim 31, wherein
said collar having a removable second wall, said second removable wall being removable to form a second open side of said collar, and a second adapter member configured for coupling to said second open side of said collar, said second adapter having first and second end walls for coupling to said end walls of said collar and for supporting a third electrical wiring device and a side wall extending between said first and second end walls.

* * * * *